Jan. 15, 1924.
H. E. WALKER
1,480,847
STORAGE BATTERY CLIP
Filed Oct. 27, 1919
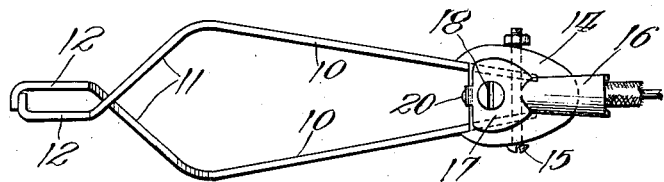
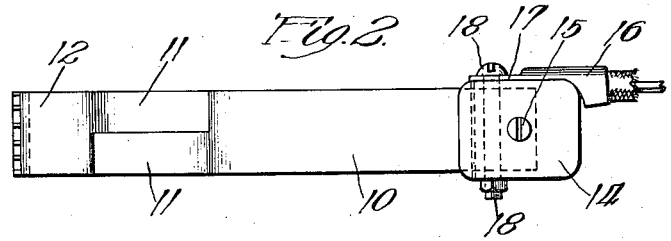
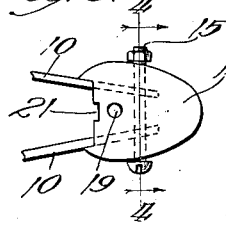
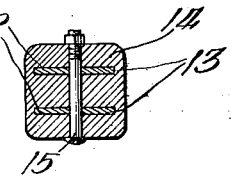
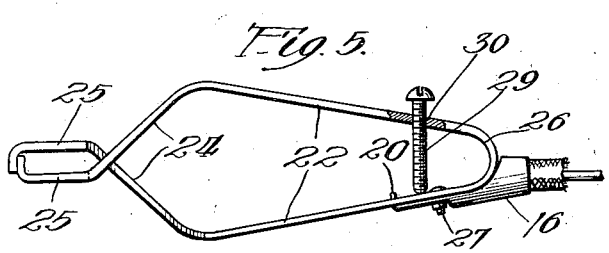
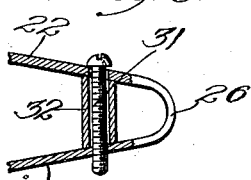
Inventor.
Herbert E. Walker.

Patented Jan. 15, 1924.

1,480,847

UNITED STATES PATENT OFFICE.

HERBERT EDWARD WALKER, OF CHICAGO, ILLINOIS.

STORAGE-BATTERY CLIP.

Application filed October 27, 1919. Serial No. 333,500.

*To all whom it may concern:*

Be it known that I, HERBERT E. WALKER, a citizen of the United States, and a resident of Chicago, in the county of Cook and State of Illinois, have invented certain new and useful Improvements in Storage-Battery Clips; and I do hereby declare that the following is a full, clear, and exact description thereof, reference being had to the accompanying drawings, and to the characters of reference marked thereon, which form a part of this specification.

This invention relates to a novel battery clip for electrically connecting the element or elements of the battery with the source of current by which the battery is charged, and refers more specifically to improvements in such clips which are designed to maintain the springing or elastic qualities of the members thereof, notwithstanding frequent flexures of the members and notwithstanding the heat which is developed at or near the point of flexure, so as to thereby avoid breaking of the members at or near the point of flexure and also to prevent detempering of said members.

The invention relates more specifically to means arranged at the flexing end of the clip for increasing the flexing length or zones of the clip members and arranged to distribute the flexing stresses so that such stresses are exerted at remotely spaced zones along the clip members instead of at a single or local point, as is common in known types of storage battery clips.

The invention has for its further object to improve and simplify clips of this general character, and the invention consists in the combination and arrangement of the parts shown in the drawings and described in the specification, and is pointed out in the appended claims.

In the drawings,—

Figure 1 is a plan elevation of a clip embodying one form of my invention.

Figure 2 is a side elevation thereof.

Figure 3 is a detailed top plan view of a portion shown in Figure 1 with the terminal element removed.

Figure 4 is a cross section on the line 4—4 of Figure 3.

Figure 5 is a plan elevation of a clip, showing a modification thereof.

Figure 6 is a detailed partial plan and partial sectional view showing a still further modification of a clip.

Figure 7 is a detail showing a further modification.

First referring to the construction shown in Figures 1 to 4, inclusive, 10, 10 designate the two resilient members or shanks of the clip which diverge from the head of the clip hereinafter described and are herein shown as formed at their outer ends with inturned portions 11 which terminate in parallel clamping jaws 12, 12 that are toothed in the usual way for grasping the element of the storage battery to which they are to be attached. The inturned portions 11, 11 of the members are made narrower than the main portions 10 thereof and the jaws 12, so that said inturned portions may move freely with respect to each other at their crossing points as indicated in Figures 1 and 2.

In the construction shown in Figures 1 to 4, inclusive, the members 10, 10 are made separate parts and engage seats in sockets 13, 13 formed in a generally triangular shaped block 14, shown best in Figures 1 and 3 the wider end of which faces the jaws. This block 14 may be made of cast metal with the sockets or seats 13, 13 formed therein while being cast, and the adjacent ends of the members 10, 10 are fitted thereinto and may be fixed in the block by a bolt 15 which extends transversely through the block or head and through registering openings in the plain ends of the members, as bes shown in Figures 1, 3 and 4.

16 designates a terminal member to which the conductor of a charging circuit is adapted to be attached, said terminal member being formed with a generally flat plate 17 that is fitted over one of the flat faces of the block or head 14 and is adapted to be attached thereto by a bolt 18 which extends through an opening 19 in the head and through a registering opening in the plate 17. In order to steady the terminal 16 on the block, it may be provided at its forward end with a spur 20 that is adapted to engage, when in position on the block, a notch 21 formed in the forward end of the block 14.

It will be noted that the block 14 constitutes a firm connection between the adjacent plain ends of the members 10 and that said members flex about fulcrum points at the outer or front side of the block 14, and flex along a long curve, so that said members are not subjected to flexing stress at localized points, which would occur if the members were joined at their rear ends by an integral flexing curve. It also will be observed that the connection of the clip members with the head in the manner described establishes two spaced or non-adjacent fulcrums about which the said members flex, so as to thereby distribute the flexing stresses along independent zones of the clip members, thus decreasing likelihood of repeated flexions breaking said clip members, as compared to known storage battery clips, and also avoiding likelihood of detempering or setting the spring or resilient clip members. By reason of the fact that the members are made of two parts, it is apparent that the clip may be more economically made with respect to the tools required, as compared to a clip in which the members are integral parts of a strip that are connected at the bend of the clip.

In Figure 5 is shown a form of clip in which the members 10 are made integral with each other and are connected by a common form of bend, and in which is employed means to space the flexion points of the clip members away from the bend. As shown in said Figure 5, 22, 22 designate the clip members; 24, 24 the narrow crossing members; 25, 25 the parallel clamping members, and 26 the integral connecting portion by which the clip members are connected at the usual bending point of the clip. Said clip is provided with the same kind of terminal 16 shown in Figures 1 and 2 which is connected to one of the clip members by a short bolt 27, said clip member having an opening therein to receive the spur 28 of the terminal. 29 designates a screw which is threaded through a threaded opening 30 in the member 22 opposite to that which carries the terminal, and the free end of said screw bears against the member which carries the terminal. With this construction it will be noted that the screw, being threaded to one of the members and bearing against the other, constitutes means for fixing non-adjacent zones or points of flexure of the members, and further constitutes means for regulating the flexing tension.

The same general function of the screw 29 shown in Figure 5 is effected in the construction shown in Figure 6 by a screw 31 which extends loosely through one of the members 22 and is threaded into the other member 22, and extends also through a spacing sleeve 32 having ends that are suitably shaped to abut against the inner sides of the members 22 near their bend. In this construction the spacing sleeve 32 fixes the points of flexure, and the tension of the spring members may be regulated by employing spacing sleeves 32 of different lengths with the same screw 31.

The tension of the members in the type of clip shown in Figures 1 to 4, inclusive, may be regulated by enlarging the width of the socket 13 to receive thin wedges 35 of varying thickness, as shown in Figure 7; and said wedges may be made of lengths to extend outwardly various distances beyond the end faces of the block 14 so as to vary the distance of the points of flexure of the members relatively to their plain ends.

It will be apparent that I have provided an exceedingly simple clip for the purpose described, the construction of which avoids likelihood of the clip breaking at the flexing zones or points, such as has been found in a clip that would be similar to the clip shown in Figure 5 with the tension screw 29 omitted. In the latter form of clip it has been found that frequent flexure of the members has a tendency to break the clip at the bending point and it has also been found that the heat transmitted to the flexing point tends to set the clip by detempering the metal.

It will be understood that the invention is not limited to the exact details shown in the drawings, but said details are capable of some variation within the spirit and scope of the claims hereto appended.

I claim as my invention,—

1. A spring clip for storage batteries and the like, comprising separate, resilient, diverging members provided at their forward ends with jaws, and obliquely crossing each other in rear of said jaws, said members being adapted to be normally urged away from each other to hold the jaws in gripping contact with a conductor element and, when pressed together, to separate the jaws to permit them to be freely passed over the conductor element, and rigid spacing and member connecting means located at the rear ends of said separate members and to constitute non-adjacent, independent fulcrums forwardly of the rear end of said clip about which said members flex.

2. A spring clip for storage batteries comprising separate opposed, divergent, resilient members provided with normally contacting clamping jaws at their free forward ends, a rigid block between the rear ends of said members and formed with seats which diverge towards said jaws, the rear ends of said members engaging said seats, and means extending through said block and said rear ends of the clips at said seats to fix the said members to said block, said members flexing about fulcrums formed at the forward ends of the seats and a distance forwardly from the rear ends of the members.

3. A spring clip for storage batteries comprising a block formed with forwardly extending divergent sockets to constitute seats for resilient clip members, resilient clip members having rear plane ends inserted in said sockets and engaging said seats and projecting from the block in outwardly divergent relation and provided at their free ends with normally contacting jaws, and fastening means extending through the block and rear ends of said clip members at said seats.

4. A clip for the purpose set forth comprising two separately formed members formed at one end to provide clamping jaws, a solid block at the other end of the clip having sockets to receive the flexing ends of the jaws, and wedges adapted to be interchangeably inserted in said sockets between the members and the walls of the sockets.

5. A spring clip for storage batteries comprising separate resilient members provided with clamping jaws at their forward ends, in combination with a rigid block provided with forwardly diverging seats adapted to engage the rear ends of the members, whereby said members will lie in forwardly diverging planes and will flex about said block forwardly beyond their rear ends, and means securing said ends engaged with said seats, substantially as described.

6. A spring clip for storage batteries comprising a pair of separate spring jaw members having substantially straight shanks disposed at an acute angle to each other, a rigid wedge shaped connecting member having two diverging faces in contact with the sides of said shanks and having a base portion between the said faces and facing toward the diverging parts of the shanks and a fastening device extending through the ends of said shanks and through said connecting member at said faces to rigidly fasten the member and shanks securely together.

In testimony, that I claim the foregoing as my invention I affix my signature in the presence of a witness.

HERBERT EDWARD WALKER.

Witness:
M. L. HALL.